United States Patent
Barthel et al.

(10) Patent No.: US 9,890,887 B2
(45) Date of Patent: *Feb. 13, 2018

(54) QUICK CONNECTOR

(71) Applicant: TI Automotive (Fuldabrück) GmbH, Fuldabrück (DE)

(72) Inventors: Iris Barthel, Schauenberg (DE); Alexander Bol, Baunatal Guntershausen (DE); Kay Bube, Schenklengsfeld (DE); Hans Jensen, Dettingen unter Teck (DE); Rick Pepe, Macomb, MI (US); Albert (Seong-Hwa) Choo, Incheon (KR)

(73) Assignee: TI Automotive (Fuldabrück) GmbH, Fuldabrück (DE)

( * ) Notice: Subject to any disclaimer, the term of this patent is extended or adjusted under 35 U.S.C. 154(b) by 709 days.

This patent is subject to a terminal disclaimer.

(21) Appl. No.: 14/155,099

(22) Filed: Jan. 14, 2014

(65) Prior Publication Data
US 2014/0197629 A1    Jul. 17, 2014

Related U.S. Application Data

(60) Provisional application No. 61/752,787, filed on Jan. 15, 2013, provisional application No. 61/760,864, filed on Feb. 5, 2013.

(30) Foreign Application Priority Data

Nov. 8, 2013 (EP) ..................... 13192083

(51) Int. Cl.
*F16L 37/138* (2006.01)
*F16L 37/098* (2006.01)
*F16L 37/084* (2006.01)

(52) U.S. Cl.
CPC ......... *F16L 37/138* (2013.01); *F16L 37/0841* (2013.01); *F16L 37/0985* (2013.01); *F16L 2201/10* (2013.01)

(58) Field of Classification Search
CPC ..... F16L 37/138; F16L 37/0985; F16L 37/08; F16L 37/084; F16L 37/0841;
(Continued)

(56) References Cited

U.S. PATENT DOCUMENTS 5,178,424 A * 1/1993 Klinger ............... F16L 37/0985
                                                          285/319
5,211,427 A    5/1993 Washizu
(Continued)

FOREIGN PATENT DOCUMENTS

EP    2497991 A1 *    9/2012    ............. F16L 57/02

*Primary Examiner* — David E Bochna
*Assistant Examiner* — James A Linford
(74) *Attorney, Agent, or Firm* — Brinks Gilson & Lione

(57) ABSTRACT

A quick connector for making a releasable connection in a fluid line with a connector body, a male member, a retainer and a verification element. The connector body comprises a through bore, wherein the male member introduced into the through bore is releasably fixable in the through bore by the retainer. The retainer comprises a ring and the verification element has an annular body. The annular body of the verification element can be displaced in an axial direction with respect to the through bore from an initial open position to a verification position when the male member is secured by the retainer in the through bore to place the verification element in a verification and locked position. In one form, the retainer includes lifting arms pivotably attached within coupling openings which cooperate with the coupling projections of the verification element to permit axial transla- (Continued)

tion of the verification element to the verification position when the male member is fully inserted into the through bore.

17 Claims, 13 Drawing Sheets

(58) Field of Classification Search
CPC ... F16L 37/086; F16L 37/098; F16L 37/0982; F16L 37/0847; F16L 37/101; F16L 37/12; F16L 37/133; F16L 47/12; F16L 47/06; F16L 47/065; F16L 47/08
See application file for complete search history.

(56) References Cited

U.S. PATENT DOCUMENTS

| | | | |
|---|---|---|---|
| 5,303,963 A * | 4/1994 | McNaughton | F16L 5/06 285/140.1 |
| 5,496,074 A * | 3/1996 | Viratelle | F16L 37/0982 285/315 |
| 5,568,946 A | 10/1996 | Jackowski | |
| 5,630,570 A * | 5/1997 | Lacroix | F16L 37/0985 251/149.9 |
| 5,704,658 A | 1/1998 | Tozaki et al. | |
| 6,155,612 A | 12/2000 | Szabo | |
| 6,260,889 B1 | 7/2001 | Tozaki et al. | |
| RE38,204 E | 7/2003 | Kazarian | |
| 7,434,846 B2 | 10/2008 | Baumgartner | |
| 9,194,521 B2 * | 11/2015 | Cichorek | F16L 37/0982 |
| 2001/0043833 A1 | 11/2001 | Bahner et al. | |
| 2004/0061332 A1 * | 4/2004 | Takayanagi | F16L 37/0847 285/319 |
| 2005/0006896 A1 * | 1/2005 | Naito | F16L 37/133 285/316 |
| 2006/0134360 A1 * | 6/2006 | Inoue | B32B 1/08 428/36.91 |
| 2006/0220380 A1 * | 10/2006 | Yoshino | F16L 37/0985 285/319 |
| 2008/0238087 A1 * | 10/2008 | Wang | F16L 25/009 285/39 |
| 2009/0091124 A1 * | 4/2009 | Tiberghien | F16L 37/0985 285/81 |
| 2009/0167018 A1 | 7/2009 | Lien | |
| 2009/0230673 A1 * | 9/2009 | Freter | F16L 37/098 285/93 |
| 2012/0319401 A1 * | 12/2012 | Wang | F16L 37/0985 285/363 |
| 2014/0125051 A1 | 5/2014 | Barthel et al. | |

* cited by examiner

QUICK CONNECTOR

CROSS REFERENCE TO RELATED APPLICATION

This application claims priority pursuant to Title 35 USC § 119 to U.S. Provisional Application No. 61/752,787, filed Jan. 15, 2013, entitled "Quick Connector," and U.S. Provisional Application No. 61/760,864, filed Feb. 5, 2013, entitled "Quick Connector," and EP application No. 13 192 083.7, filed Nov. 8, 2013, entitled "Quick Connector," the entire content of the specification and drawings of which are hereby incorporated by reference herein as if fully set forth.

BACKGROUND

The invention relates to a quick connector for making a releasable connection in a fluid line with a connector body, a male member, a retainer and a verification element. Quick connectors of the type mentioned above are basically known from practice. It has initially proved itself to secure a male member with a retainer in a connector body. In addition, a verification element may be provided with which the proper fixation of the male member in the connector body by the retainer is provided. Such a quick connector is known, for example, from EP 1 719 944 B1. A horseshoe-shaped retention element holds a male member in a connector body, wherein a likewise horseshoe-shaped verification element only then can be moved in the radial direction with respect to a through bore of the connector body, when a radial upset of the male member is in contact with the verification element. The quick connector according to EP 1 719 944 B1 has generally proven itself in practice. However, it is desirable to simplify the structure of such a quick connector.

The underlying technical problem of the invention is therefore to propose a quick connector of the initially specified type that is characterized by a high reliability, a simple mounting and a high stability. The inventive quick connector is useful, for example, in the fluid line systems of internal combustion engines, in particular of vehicles. It is within the scope of the invention that the quick connector is used in a brake pipe system, the fuel line system and/or a urea solution conduit system.

To solve the technical problem, the teaching of the invention provides a quick connector to produce a releasable connection in a fluid line with a connector body, a male member, a retainer, and a verification element, wherein the male element that is introduced into the through bore can be held in the through bore by the retainer, preferably in a releasable connection, wherein the retainer comprises a ring, wherein the verification element comprises an annular body, wherein the ring and the annular body extend circumferentially around the connector body, and wherein the verification element can be moved in an axial direction with respect to the through bore from a free or unlatched position into a verification or latched position, when the male member is secured with the retainer in the through bore. Moreover, the verification element provides an additional locking mechanism to supplement the releasable retention of the male member within the connector body.

The connector body is suitably formed by at least two separate parts, namely a head element and a sealing element. It is recommended that a portion of the head element is inserted into the sealing element of the connector body. At least the sealing element of the connector body is advantageously made of an electrically conductive material, in particular an electrically conductive plastic (ESD plastic).

According to one embodiment, the full connector body is made of conductive material. It is recommended that the through bore extends between a preferably head-end male member entry port of the connector body to a preferably sealing element side exit port. It is recommended that the through bore is formed circular and has a longitudinal axis or center axis which within the scope of the invention extends from the entry port to the exit port. Suitably, the exit port is arranged at an end of the sealing element that is facing away from the head element.

It is within the scope of the invention that the head element is, preferably releasably, latched to the sealing element. According to one embodiment, the connection between the head element and the sealing element is designed such that it can be permeated by liquids, that is, not fluid-tight.

Suitably, the head element has connecting elements, which cooperate with sealing element complementary connection elements. To produce the locking connection between the head element and the sealing element, the preferably cylindrical or substantially cylindrical portion of the head element is inserted into an insertion receptacle defined by the through bore of the sealing element. The portion of the head element that is inserted into the sealing element is preferably formed as the insertion section that supports the connecting element or the connecting elements to releasably retain the male member. Preferably, the sealing element comprises at least one locking opening, in which locking opening a locking protrusion of the head element engages to secure the head element to the sealing element. More preferably, a wall of the sealing element has two, and preferably four locking openings. The locking openings are preferably arranged equidistantly in the advantageously cylindrical wall of the sealing element. According to one proven embodiment, each locking opening is assigned one locking protrusion on the insertion section of the head element. By displacing the locking protrusions in the direction of the central axis of the through bore, it is possible within the scope of the invention, to separate the head element from the sealing element and advantageously remove it from the through bore of the sealing element.

It has proven itself that the through bore in the connector body, and preferably in the sealing element, has a sealing section, in which sealing section is retained at least one seal pack. For example, the seal pack is formed by two annular seals, between which annular rings is arranged a spacer (intermediate element).

The male member is preferably formed as an advantageously cylindrical tube with a flow channel, wherein a longitudinal axis of the flow channel in the assembled state is preferably aligned or approximately aligned with the central axis of the through bore. It is within the scope of the invention in that the male member includes a radial annular upset, which radial annular upset protrudes over the preferably cylindrical sealing surface of the male member. In other words the radial annular upset is formed as a bulge that is arranged on an exterior surface of the male member, that is, radially outward of the flow channel.

In the assembled state, the male member is inserted into the through bore, wherein the seal pack of the quick connector is fluid-tightly resting against the sealing surface of the male member. According to an embodiment, the male member includes an insertion end having a conical or spherical shell segment-shaped face end. In this manner, the male member can be easily inserted into the through bore and/or into the seal pack that is preferably formed as one or more O-ring seals. In the present invention, assembled state means that the male member is inserted into the connector body and fixed in the connector body with the retainer, wherein the connector body is preferably formed by the combination of the head element, connected to the sealing element.

The retainer surrounds the radially outward surface of the connector body, preferably the head element. In a preferred configuration it comprises an oval shaped ring having a diameter on its minor axis slightly larger than the diameter of the head element, and a diameter on its major axis sufficiently large to permit compression radially inwardly to cause the ring to expand radially outwardly on its minor axis.

The retainer preferably has at least one retaining element or locking lug, which, in the assembled state, co-operates with the radial annular upset of the male member, and with which retaining element the male member can be secured in the connector body. The retaining element preferably extends through a window that is arranged in the connector body, preferably in the head element of the connector body, in order to secure the male member in the connector body. Preferably, the retaining element and the window associated with the retaining element provide an anti-rotation security, due to which a rotation of the retainer relative to the connector body is excluded. It is recommended that the retainer comprise two, retaining elements or locking lugs, wherein each retaining element is associated with a window in the connector body, preferably in the head element of the connector body. It is recommended that, in the assembled state of the quick connector, the retaining elements extend through the windows and interact with the radial annular upset of the male member in such a way that the male member is secured in the connector body. According to a preferred embodiment, the two retaining elements are preferably arranged opposite to each other, or diametrically on the retainer or on the ring at the minor axis. Apart from the position on the ring or the retainer, the retaining elements are suitably of an identical or substantially identical design. Preferably, the retaining element(s) are connected to the ring of the retainer such that the retaining element or the retaining elements point in the radial direction to the center axis of the through bore, and particularly preferably are spring-mounted by the ring shape of the retainer. Advantageously, a spring force is acting on the retaining element or the retaining elements, by which spring force the retaining element is pushed in the direction of the central axis of the through bore.

It is particularly preferable that the verification element is releasably axially displaceable from an initial open or unlatched position to the latched, or verification position in the axial direction with respect to the through bore, only when the male member is held by the retainer in the connector body. In the open or unlatched position, the verification element is positioned axially rearward, or toward the stem end of the connector body. In the latched, or verification position, the verification element is positioned axially toward the entry port end of the connector body.

When in the verification position, the verification element is advantageously connected, preferably releasably, to the retainer. In this way, it is ensured that a proper connection between the male member and the connector body is reliably and durably provided. According to one embodiment, the verification element, in the verification position is unreleasably connected to the retainer.

It is within the scope of the invention that in the open position and/or in the verification position, the verification element is, preferably releasably, locked in with the retainer. Particularly preferably, the verification element comprises at least one coupling element, which coupling element in the open position of the verification element co-operates with a complementary coupling element of the retainer. In this way, when in the open position the verification element is latched with the retainer. According to one embodiment, the coupling element is formed as a coupling projection, wherein the complementary coupling element in the retainer is formed as a coupling opening and wherein, in the open position of the verification element, the coupling projection is arranged in the coupling opening. Advantageously, the interaction of the verification element coupling element with the retainer complementary coupling element provides firm connection protected against axial translation of the verification element. Preferably a rotation of the verification element relative to the retainer, in the open position of the verification element is also prevented or excluded. According to an embodiment, the verification element comprises two, and preferably only two, coupling projections, which are arranged preferably diametrically to the annular body of the verification element. Each coupling element is suitably assigned an associated coupling opening in the retainer.

According to an advantageous embodiment, the verification element and/or the retainer is/are captively held on the connector body. The annular body of the verification element preferably comprises a preferably oval cross-section as is the ring of the retainer. It is within the scope of the invention that, in the assembled state of the quick connector, the connector body, preferably the head element is arranged within an interior space defined by the ring of the retainer and within an interior space defined by the annular body of the verification element. Basically, it is possible that the annular body and/or the ring have a quadrangular or rectangular cross-section, wherein the corners of the square or rectangle are rounded. According to an embodiment, the annular body and/or the ring is/are circular.

It is recommended that to produce a pre-assembled state of the quick connector, the head element of the connector body is introduced into the interior space of the ring of the retainer and into the interior space of the annular body of the verification element so that preferably the annular body and of the ring each extend circumferentially around the head element. Preferably, the head element carries the ring of the retainer and the annular body of the verification element and the head element is then connected to the sealing element to form the pre-assembled state. In the pre-assembled state, the male member is preferably not positioned in the connector body or otherwise secured in the connector body. In the pre-assembled state, and particularly preferably in the assembled state, it is advantageously ensured so that the retainer and/or the verification element cannot be pulled away from the connector body in the axial or radial direction. According to a preferred embodiment of the invention, the retainer is arranged between the verification element and the entry port of the head element on the connector body.

Advantageously, the connector body and preferably the head element has a collar circumferentially extending around the entry port, wherein according to an embodiment, the collar prevents pulling the retainer or the verification element from the connector body in the axial direction in the direction of the entry port. Preferably, the collar has a larger cross-section than the head element in a region, in which in the assembled and/or pre-assembled state the retainer and the verification element are arranged. In the assembled state and pre-assembled state, the collar preferably completely or substantially completely covers the retainer and the verification element. Within the scope of the invention, cover means that in the front view of the collar, the collar completely or essentially completely covers the retainer and/or the verification element. It is within the invention that the collar has an oval or approximately oval cross-sectional area, wherein in the cross-sectional area of the collar is arranged the insertion opening for the male member. The sealing element preferably has a larger circumference than the head element so that the verification element and/or the retainer cannot be pulled off the connector body in the axial direction toward the exit port.

Preferably, in the open position of the verification element the coupling projection extends in the radial direction through the coupling opening of the retainer into the through bore, where it is prevented from axial translation. Upon insertion of the male member into the connector body the coupling projection can be pressed away by the radial upset of the male member in the radial direction from the longitudinal axis of the through bore in such a way that the verification element is displaceable in the axial direction from the open position to the verification position.

According to one embodiment of the quick connector of the invention the coupling openings of the retainer include lifting arms cantilevered at the axially inward ends of the coupling openings. These lift arms are thus interposed between the coupling projections of the verification element and the through bore of the connector body and impede penetration into the through bore by the coupling projections. The coupling projections of the verification element reside on the radial outer surface of the lifting arms of the retainer. In this embodiment the radial upset on the male member, preferably coacts with the lifting arms, to push the verification element coupling projections away from the longitudinal axis of the through bore in the radial direction, such that the verification element can be slid in the axial direction, from an initial open position to the verification position. The lifting arms are advantageously formed as an integral piece positioned within the coupling openings of the retainer. It is recommended that the verification element coupling projections lie directly on the lift arms, within the coupling openings and, particularly preferably, directly on a lifting arm, respectively, such that, according to the one embodiment, the radial upset of the male member presses exclusively against the verification element coupling projection lifting arms, respectively. It is contemplated that the coupling projections, respectively, lie against a surface of the lifting arms facing radially away from the through bore.

Thus, according to one embodiment of the disclosure, the radial upset of the male member acts directly against the coupling projections of the verification element, and according to another embodiment of the disclosure, the radial upset of the male member exerts a radial outward pressure on the coupling projections, exclusively via the lifting arms, within the coupling openings of the retainer. In either embodiment, on radial outward displacement of the coupling projections, the verification element may be axially displaced from an initial open position to the verification position.

The illustrated embodiments of the invention herein described include two diametrically opposed coupling projections on the verification element and two coupling openings formed on the retainer, also in diametrically opposite locations. It is, of course, possible for the coactions herein described to be provided employing only a single coupling opening with a lifting arm disposed therein and a single coupling projection coacting therewith.

Advantageously, the coupling projection includes a sloping contact surface so that the verification element is pushed axially away from the entry port when the radial upset of the male member abuts on the sloping contact surface and thereby pushes the coupling projection away from the longitudinal axis of the through bore. The sloping contact surface is orientated obliquely relative to the longitudinal axis of the through bore toward the exit port inward in the direction of the longitudinal axis of the through bore. If the male member provided with the radial upset is introduced, for example, into the connector body preassembled with the retainer and the verification element, the radial upset of male member must first be inserted into the entry port of the through bore in the direction of the exit port. The movement of the male member, starting from the entry port towards the exit port is, in the present invention, designated as the direction of insertion. After insertion of the male member into the entry port in the direction of insertion, the radial upset preferably initially passes the entry port, and, preferably immediately afterwards, the retainer. Once the radial upset is moved past the retainer in the direction of insertion, the radial upset advantageously hits the sloping contact surface of the coupling element of the verification element. By the application of axial force to the sloping contact surface the radial upset of the male member, the coupling element of the verification element is preferably axially displaced in the direction of the exit port, and particularly preferably, the coupling projection is pushed in the radial direction away from the longitudinal axis of the through bore. According to an embodiment the coupling element comprises two coupling projections, each with a sloping contact surface.

According to one embodiment, the retainer includes a coupling element receptacle, which is preferably openly formed only on one radially outward surface of the retainer that is distal to the through bore and wherein in the verification position of the verification element, the verification element coupling element (coupling projection) resides in the coupling element receptacle. Suitably the verification element is displaceable from the initial open position to the verification position only or exclusively, when the coupling element of the verification element is displaced to a shift, or axially displaceable position. The coupling element of the verification element is in the shift position, when the radial upset of the male member radially abuts onto the sloping contact surface of the coupling element (coupling projection) and the coupling element is pushed radially away from the longitudinal axis of the through bore.

According to one embodiment, each coupling projection preferably exhibits, a front surface facing the entry opening end, oriented to be able to be brought into contact with an abutment surface formed on the retainer locking lugs when the verification element is in the open position, and is to be displaced axially outward, opposite to the direction of insertion of the male member, toward the entry opening. In this condition, axial displacement of the verification element toward the entry opening is precluded. Thereafter, through radially outward action on the lifting arms in the coupling openings of the retainer, the coupling projections are urged radially outward from the longitudinal axis such that the verification element locking projections are released from blockage by the abutment surfaces and the verification element can be displaced to the verification position in a direction opposite to the direction of insertion of the male member. In the verification position, the coupling projections are locked within the coupling receptacles of the locking lugs of the retainer.

It is recommended that by an axial displacement of the verification element, preferably parallel to the longitudinal axis of the through bore in the direction of the entry port, the coupling element is transferred to the coupling element receptacle of the retainer. It is possible that in the verification position the verification element is unreleasably locked with the retainer.

According to a preferred embodiment, the coupling element of the verification element comprises preferably two coupling projections, wherein the coupling projections have a distance from each other set up in the direction of a diameter or a center of the through bore, which distance is smaller than the diameter of the radial upset of the male member so that the male member in the verification position of the verification element is each time secured in the connector body by the retainer and the verification element. According to one embodiment, the lifting arms of the retainer within the coupling openings are disposed between the radial upset of the male member and the verification element coupling elements and in their free undeformed state exhibit a radial spacing, smaller than the diameter (outer diameter) of the radial upset. Advantageously, the lifting arms are connected to the retainer, diametrically opposite one another, wherein it is particularly preferred that each lifting arm is assigned only one coupling projection. Advantageously, the male member is redundantly held in the through bore of the connector body by the retainer and the verification element. If, for example, due to mechanical damage the retainer can no longer secure the male member in the connector body, the verification element with the coupling projection(s) secures the coupling of the male member in the through bore of the connector body.

It is within the scope of the invention that the verification element coupling projections are each accommodated in a coupling receptacle of one of the retainer locking lugs when the verification element is disposed in the verification position, and in this manner, the locking lugs of the retainer press against the male member. It is ensured in this manner that if the male member moves opposite to the insertion direction, the upset is brought in to contact with the abutment surfaces of the locking lugs, and as a result, cannot be pulled out of the through bore.

According to an embodiment, in a retaining element, a coupling receptacle is formed, wherein the opening of the coupling receptacle is formed in a radially outward face of the retaining element that is facing away from the through bore. According to an advantageous embodiment, the number of the coupling receptacles corresponds to the number of the coupling elements on the verification element.

Advantageously, the or each retaining element comprises a guide surface that is obliquely oriented to the central axis of the through bore, which guide surface is formed in such a manner that upon insertion of the male member into the through bore the retaining element be pressed by the radial upset radially outwards with respect to the through bore. According to a preferred embodiment, the guide surface extends from an entry port end of the guide surface to an exit port side end of the guide surface, in the radial direction obliquely inwardly toward the central axis and axially toward the exit port of the through bore. To produce the assembled state, the male member is suitably introduced into the connector body that is provided with the retainer and the verification element, or into the pre-assembled connector body. According to an embodiment, during the insertion the radial upset of the male member is brought in contact with the guide surface or surfaces so that the retaining element or the retaining elements are pressed outwardly in the radial direction or away from the central axis of the through bore. Once the radial upset of the member is suitably moved past the retaining element or retaining elements in the axial direction, the retaining element or retaining elements are preferably acted upon by the spring force and thus preferably pressed radially inward in the direction of the central axis. The abutment surface(s) of the retaining element is(are) brought into a rest in abutting relation to an outward radial annular surface of the radial upset of the male member that is suitably oriented transverse to the longitudinal axis of the through bore. The abutment surface(s) of the retaining elements are particularly preferably oriented transversely to the central axis of the through bore.

According to an embodiment, the retaining element(s) is/are connected to the retainer such that the guide surface of the retaining element(s) protrude into the interior space (interior ring) of the retainer that is formed as a ring. The retaining element(s) particularly preferably project(s) starting from the ring only into the interior space defined by the ring. According to an embodiment, the retaining element or each retaining element comprises a contact surface with which, in the assembled state of the quick connector, the retaining element, or each retaining element, rests on a section of preferably the sealing surface of the male member arranged between the radial upset and the entry port of the connector body. The contact surface suitable has a curvature, which corresponds to the curvature of the sealing surface of the male member. More preferably, the retaining element(s) rest on only a portion of the circumference of the male member.

According to an embodiment, at least one retaining element, preferably each retaining element, includes a security projection, which in the assembled state secures the retaining element against a displacement or deformation in the direction away from the center axis of the through bore. Preferably, each retaining element of the retainer includes one security projection. It is possible that by a pressure in the fluid system, into which fluid system the quick connector is integrated, the male member is pushed in the direction of the collar of the connector body or the head element. Advantageously, the retainer of the male member is pressed toward the collar by means of a pressure in the fluid system. The security projection of the respective retaining element advantageously co-operates with the connector body. The connector body, in particular the head element collar, suitably prevents the retaining element(s), preferably during the pressurization of the fluid system, from being moved radially outwardly from the central axis, whereby the male member is releasably secured in the connector body. Particularly preferably, the security projections in the assembled state rest on an annular surface of the through bore of the connector body, preferably of the head element or the collar. According to an embodiment, the security projection is above a collar-facing surface or end face of a retaining element. The resting of the security projection of a retaining element on the through bore-side ring surface of the head element or the collar advantageously precludes the retaining element from moving in the radial direction from the center axis of the through bore.

The retainer conveniently comprises at least one actuator, wherein a force on the actuator preferably directed to the center axis can deform the retainer such that the retaining element can be moved in radial direction from the center axis of the through bore. The actuating device is advantageously formed as a handle plate or compression plate. In a particularly preferable embodiment, the retainer has two, in particular only two, actuating devices, which are arranged opposite to each other or diametrically on the ring which is oval shaped having a major axis and a minor axis. According to an embodiment, the actuating devices are connected to the ring at the major axis such that a interconnecting the actuating devices is oriented perpendicular to another, which interconnects the retaining elements that are connected to the ring at the minor axis. If a force is exerted on the actuator(s), preferably in the radial direction inwardly or in the direction of the central axis of the through bore, the retainer formed by the ring is deformed, preferably pressed flat, so that the distance between the actuator and the central axis is particularly preferably reduced. According to a particularly preferred embodiment, the distance between the retaining elements of the retainer is at least as large as the diameter of the radial upset of the male member, when the actuating means are acted upon by a force and the retainer is pressed flat, the retaining elements are withdrawn radially outwardly away from the central axis of the through bore.

According to an embodiment, the verification element comprises at least one flat locking plate, which in the verification position and/or in the open position engages the compression element of the retainer. The locking element, or locking elements are positioned between the radially inner surface of the compression element(s) and the radially outer surface of the quick connector body. The at least one locking element couples the verification element with the retainer so that, in the assembled state of the quick connector, the retainer is deformable exclusively together with the verification element. According to a preferred embodiment, the verification element has two, and particularly preferably only two, flat locking plates, wherein in the assembled state of the quick connector, a flat locking plate bears against a compression element that is associated with the locking plate.

It is within the scope of the invention that the verification element located in the verification position is deformed when the retainer is deformed by radial inward pressure to the compression elements of the retainer. On such compression of the compression elements, the retaining element(s) connected to the ring of the retainer element are preferably moved, by the deformation of the ring, radially outward or from the central axis, and the coupling elements of the verification element retained in the coupling receptacles of the retainer are also moved radially outward or from the center axis of the through bore and the radial upset of the male member is released. The radial upset can then slide axially the direction opposite the direction of insertion past the retaining element(s) in the direction of the entry port.

In the assembled state, the retainer can slide, relative to the entry port or the collar of the connector body, in the axial direction such that the security projections of the retainer are detachable from the connector body, in particular from the annular surface of the collar, and can be preferably brought into a released state. Suitably, only in the released state of the locking element, a radial displacement of the retaining element(s) by applying force onto the compression plates is possible such that the retaining element(s) release the radial upset of the male member. Preferably, in the assembled state the retainer can be moved, preferably with the verification element that is attached to the retainer, in the axial direction toward the exit port or the sealing element.

The invention is based on the finding that the quick connector according to the invention is characterized by an advantageous high reliability and surprisingly easy assembly. Because both the retainer and the verification element are formed as a ring, surrounding the connector body, unwanted separation of the retainer and/or the verification element is avoided. The formation of the connector body in connection with the surrounding retainer and the verification element also ensures that with regard to the longitudinal axis of the through bore, only assembly steps are required that are aligned in the axial direction with respect to the through bore. The fact that in the inventive quick connector the insertion of an element in a radial direction with respect to the through bore of the connector body can be dispensed of, the inventive quick connector can also be installed, without any problem, in spatially extremely cramped conditions, for example, by one hand. The detection of a proper connection between the connector body and the male member can be determined in an advantageous manner also by one hand only, in that the verification element may be translated axially from the open position to the verification position. A high precision requiring insertion of a verification element into the connector body is avoided by the invented quick connector in a surprisingly simple manner. Furthermore, the inventive quick connector is characterized by an improved guidance of the male member, which advantageously reflects on the stability and robustness of the quick connector. Moreover, the inventive quick connector, in particular the connector body, which can be made of ESD plastics, also makes possible to discharge electrostatic charges. The inventive design and attachment of the verification element further ensures that a redundant securing of the male member formed radial upset with the connector body is achieved. Even if the retainer as the primary retention element for the male member fails, for example, because of a break, the male member is still reliably held in the through bore of the connector body by the verification element.

The invention will now be explained in more detail with reference to the drawings that illustrate an exemplary embodiment, which is not limiting.

DETAILED DESCRIPTION OF ILLUSTRATED EMBODIMENTS

Figure 1:
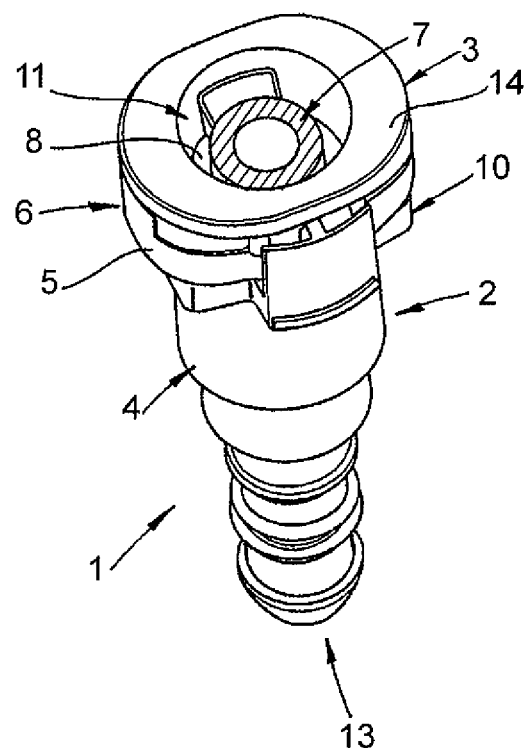
FIG. 1 shows a perspective view of a quick connector according to the invention in the assembled state.

FIG. 1 shows an inventive quick connector 1 for producing a releasable connection in a fluid line of a motor vehicle.

The quick connector 1 has a connector body 2, which is formed by a head element 3 and a sealing element 4. Around the head element 3 extends a retainer 6 designed as a ring 5, which releasably secures a tubular male member 7 in the connector body 2. The male member 7, seen in FIGS. 4 to 8, is a tube and has a radial upset 8, which protrudes over a sealing surface 9 of the male member 7. Furthermore, the quick connector 1 of FIG. 1 has a verification element 10, which is arranged according to FIG. 1 in a verification position and in this way indicates that the male member 7 is properly held by the retainer 6 in the head element 3 of the connector body 2 of the quick connector 1.

Figure 2:
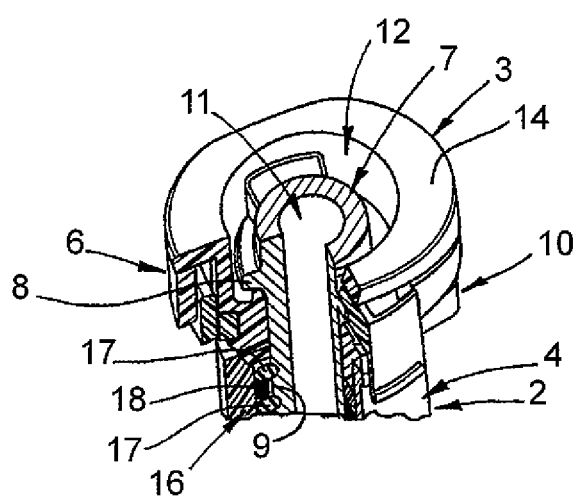
FIG. 2 shows a partial view, in section, of the quick connector of FIG. 1.

According to the embodiment, the connector body 2 has a through bore 11, about a central axis 25 which extends from an entry port 12 to an exit port 13. The entry port 12 shown in FIG. 1 is arranged in an end face 37 of the head element 3, while the exit port 13 is arranged at an inward end of the sealing element 4. Further illustrated in the partial section of FIG. 2 is that in the sealing element 4, a sealing assembly 16 is arranged, which is formed by two O-ring seals 17, and an intermediate element 18 that is arranged between the O-ring seals 17. According to FIG. 2, the seal assembly 16 seals against the connector body 2 in through bore 11, and against the sealing surface 9 of the male member 7.

In this description, axially inward means toward the exit port 13 and axially outward means toward the entry port 12. Radially inward used herein means toward the central axis 25 of the connector body, and radially outward means in the opposite direction.

Figure 9:
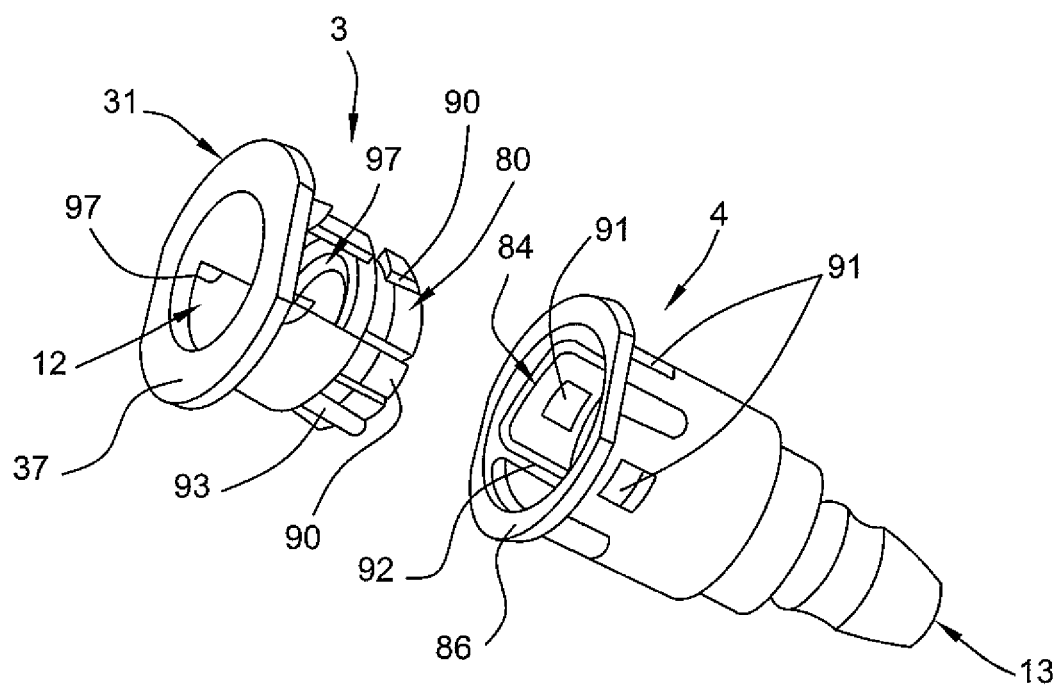
FIG. 9 is an exploded view of the components of the connector body.

In FIG. 1 a quick connector coupling 1 is shown, which includes a generally cylindrical hollow two piece body comprising a head element 3, which is connected to a sealing element 4. These elements define through bore 11 along longitudinal axis 25. The head element 3 includes a male member entry port 12 at one end formed by cylindrical surface 33 extending inward from end face 37. A collar 31 surrounds end of head element 3 at entry port 12. Referring to FIG. 9, the opposite end of head element 3 comprises an insertion portion having an axially slotted wall 80. An annular wall of the head element 3 extending between collar 31 and slotted wall 80 defines diametrically spaced windows 97 open to the through bore 11.

In accordance with FIG. 9 the sealing element 4 includes an exit port 13 at an end axially farthest away from the head element 3. As illustrated, the end of sealing element 4 defining the exit port 13 is configured to define a barbed hose connection aligned along longitudinal axis 25. As is common in quick connector configurations, the barbed hose connection end of the connector body could be disposed at some angle relative to the rest of the connector body, for example, at a ninety degree (90°) angle.

Preferably and in accordance with FIG. 9 the end of the sealing element 4 axially nearest the insertion portion of the head element 3 comprises an insertion receptacle 84 sized to axially receive and support the insertion portion slotted wall 80. The sealing element 4 includes a radial flange 86 surrounding the open end of the insertion receptacle 84.

FIG. 9, showing the connector body 2, shows that the slotted wall 80 of head element 3, in accordance with a design example, includes four locking protrusions 90 at the insertion portion, which are inserted into the sealing element 4 in the assembled condition of the quick connector body 2. In the assembled condition of the quick connector body 2 the locking protrusions 90 take hold in the corresponding locking openings 91 of the sealing element 4. As a result of the locking protrusions 90 taking hold in the corresponding locking openings 91 the head element 3 is fixated to the sealing element 4.

The insertion receptacle 84 includes groove-shaped guides 92, in which, in assembled condition, complementary guides of the head element 3 in the shape of ribs 93 take hold. In accordance with the design example of the head element 3 is fixated to the sealing element 4 in anti-twist fashion. As illustrated, the insertion receptacle 84 includes four groove-shaped guides 92 and four locking openings 91 and the insertion portion of the head element 3 of the connector body includes two equally spaced ribs 93 and four equally spaced locking protrusions 90. Thus, the rotational orientation of the head element 3 relative to the sealing element 4 may be indexed in ninety degree (90°) intervals. This is important in instances for example, when the stem end is formed at an angle, for example, a ninety degree (90°) angle to the remainder of the connector body along axis 25.

As shown in FIGS. 1 and 2, the head element 3 is interlocked with the sealing element 4 with the insertion portion of the head element disposed within and locked into the insertion receptacle 84 of the sealing element 4.

Figure 3:
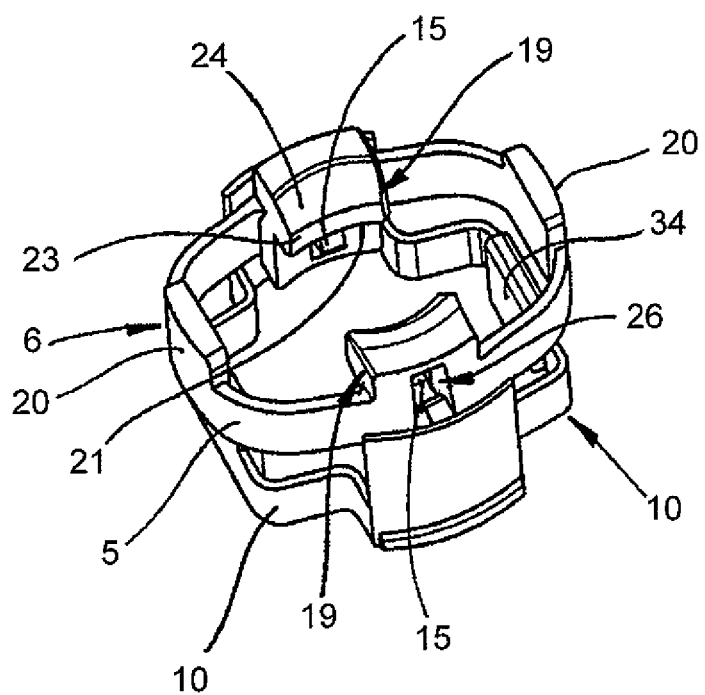
FIG. 3 is a perspective view of a retainer and a verification element of the quick connector according to the invention.

FIG. 3 illustrates the retainer 6 and the verification element 10 of the quick connector. The retainer 6 in a pre-assembled condition encircles the head element 3. It includes a ring 5 which has two retaining elements in the form of locking lugs 19 and two compression plates 20. The two retaining elements 19 and the two compression plates 20 are respectively arranged diametrically on the ring 5 of the retainer 6.

FIG. 1 shows that the retainer 6 having ring 5 surrounds the head element 3. The locking lugs 19 reach through windows 97 in the wall of the head element 3 and extend into the through bore 11 of the connector body 2. The windows 97 have an axial length somewhat longer than the axial length of the locking lugs 19 to permit limited axial translation of the retainer 6 and locking lugs 19.

As best seen in FIGS. 1 and 3, the ring 5 is oval shaped having a diameter on its minor axis slightly larger than the outer surface of the head element 3. As illustrated, the locking lugs 19 are provided on ring 5 at the minor axis. The ring 5 has a diameter on its major axis about a third larger than the diameter along the minor axis. As illustrated, the compression plates 20 are provided on ring 5 at the major axis. This relationship permits compressive deformation of the ring toward the extent of the head element 3. Such compression at the compression plates 20 deform the ring 5 to a generally circular form. This action is sufficient to withdraw the locking lugs 19 from the through bore 11 but not from windows 97.

Figure 4:
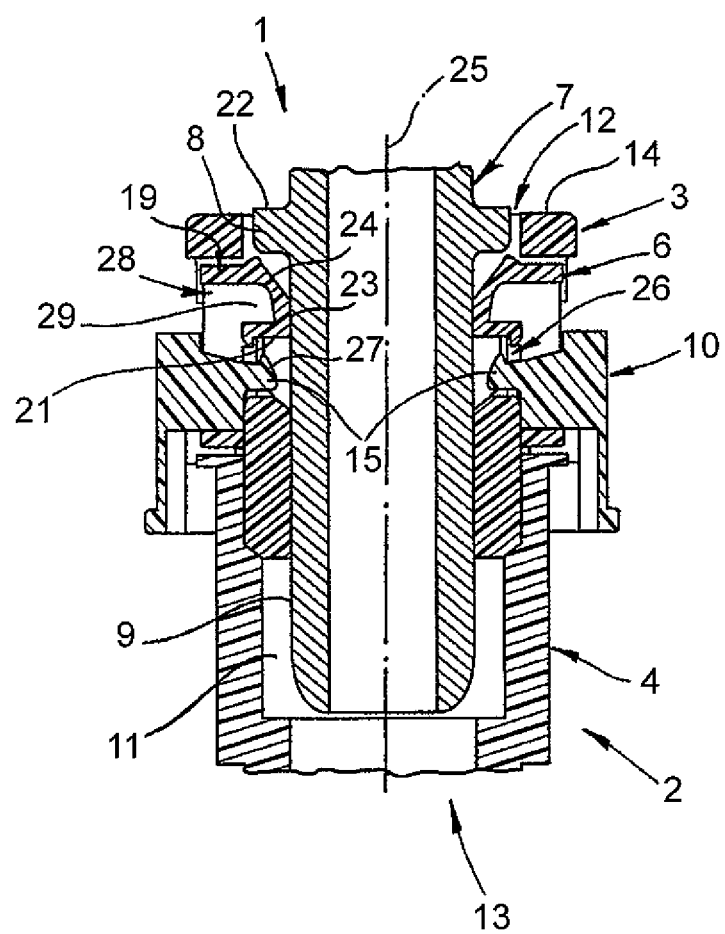
FIG. 4 shows a section through the quick connector in a first operating position.
Figure 5:
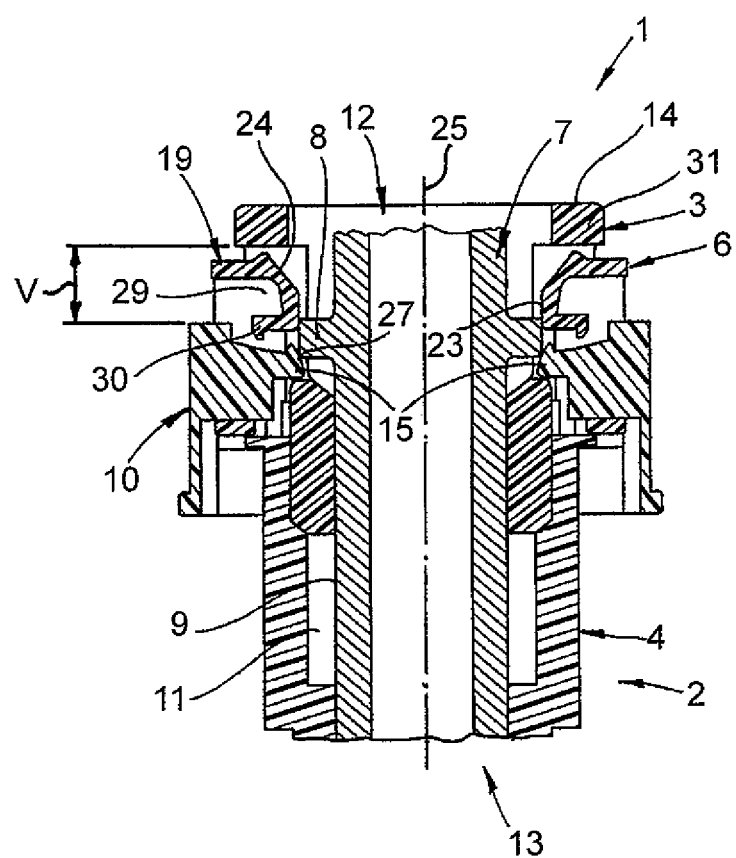
FIG. 5 shows a section through the quick connector of FIG. 4 in a second operating position.
Figure 6:
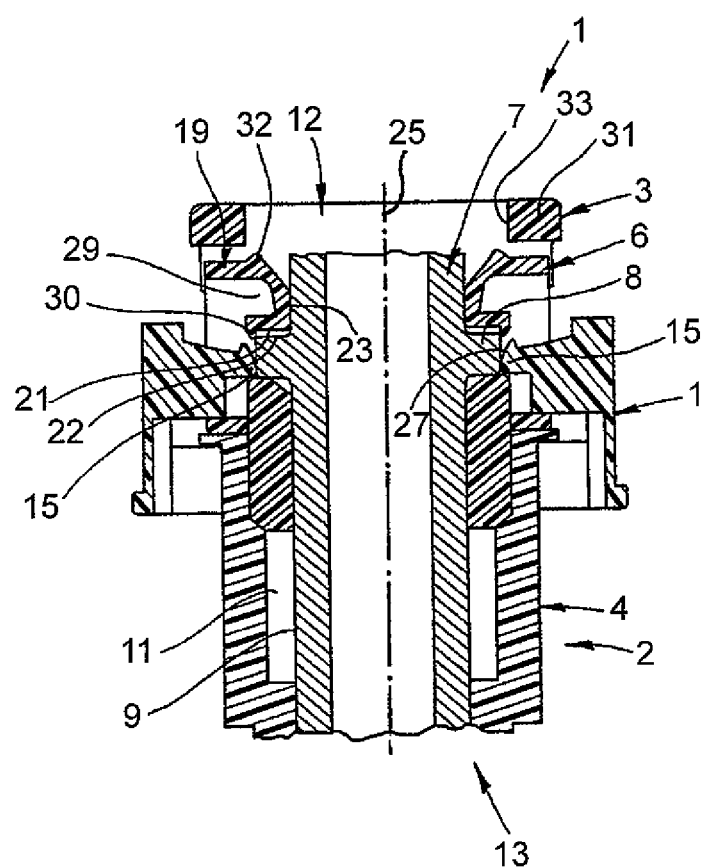
FIG. 6 shows a section through the quick connector of FIG. 4 in a third operating position.

The locking lugs 19 of retainer 6 each have an abutment surface 21, facing axially inward as seen in FIGS. 4 to 8, by which in the assembled state the retainer 6 abuts on an outward radial annular surface 22 of the radial upset 8 of male member 7. As seen in FIG. 5, locking surfaces 21 terminate in an axially inward directed ridge 30. As seen in FIG. 6 the ridges 30 are spaced apart a distance somewhat greater than the size of the outer diameter of radial upset 8 of male member 7. Thus, when abutment surfaces 21 of locking lugs 19 abut the outward 4 radial annular surface 22 of a radial upset 8 the ridges 30 reside radially outward of the radially outer surface of upset 8. Further, as illustrated in FIG. 4 the retaining elements 19 each have axial outward opening, inward from coupling openings 26 forming a coupling element receptacle 29 extending radially inward toward the contact surfaces 23 of the retaining element 19.

Furthermore, the retaining elements 19 each have an axial contact surface 23, which is curved in accordance with the embodiment, and has the same curvature as the outer surface of the male member 7 at the sealing surface 9. In the assembled state, the contact surfaces 23 of retaining elements 19 rest against the sealing surface 9 of the male member 7 outward of radial upset 8.

FIGS. 3 and 4 further illustrate that the retaining elements 19 each have an angled guide surface 24 starting from an outward end of the guide surfaces 24 and extending inwardly obliquely in the direction of a central axis or the longitudinal axis 25 of the through bore 11, and converge in the direction toward the exit port 13. As seen in FIG. 6, the forwardmost ends of the guide surfaces 24 nearest the entry port 12 each form a security projection 32. The security projections 32 are arranged to engage, in the assembled condition, cylindrical surface 33 of the head element 3 defining the entry port 12.

The axial spacing between the collar 31 of head element 3 and the radial flange 86 of sealing element 4 is larger than the axial extent of the ring 5 of retainer 6 thus permitting limited axial movement of the retainer 6 relative to the connector body 2. Such movement is limited by the axial length of the compression plates 20 which abut the collar 31 on translation in the axially outward direction. The retainer 6 is unrestrained between limits of its permissible axial movement. Bias toward the entry port 13 end of connector body 2 is provided by pressurization of the fluid system which acts on the end of the male member 7 that resides within the through bore 11.

The foregoing limited axial movement of retainer 6 is necessary to permit disengagement of the security projections 32 from cylindrical surface 33 of head element 3 in instances where it is desired to retract or withdraw the locking lugs 19 from the through bore 11 through windows 97. Under conditions of a pressurized fluid in the fluid system, the male member 7 and consequently the locking lugs 19 are urged toward the entry port 12 in collar 31 causing the security projections 32 to engage cylindrical surface 33 preventing radial outward movement of locking lugs 19. Thus, the retainer 6 must be translated axially inward to disengage security projections 32 from cylindrical surface 33.

In FIG. 3 it can be seen that the ring 5 of the retainers 6 is oval shaped. By pressing the compression plates 20 toward each other, the retainer 6 can be deformed such that, starting from the assembled state shown in FIG. 1, locking lugs 19 may be withdrawn radially outward and the distance between the contact surfaces 23 increased such that the male member 7 including the radial upset 8 can be moved outward in the direction of the entry port 12 of the connector body 2 past the locking lugs 19 and so the male member 7 can be removed from the connector body 2.

Further illustrated in FIG. 3 is that the verification element 10 has generally annular body 14 complimentary to the ring 5 of retainer 6 that resides axially inward of retainer ring 5. As best seen in FIGS. 1 and 3, verification element 10 includes two coupling elements in the form of coupling projections 15 disposed diametrically opposed on the minor axis. A pair of manipulation plates are positioned radially outward of the coupling projections 15. As seen in FIG. 3, the manipulation plates reside outward of and in overlying relation to the portion of ring 5 of retainer 6 carrying locking lugs 19.

On its major axis, annular body 14 of verification element 10 is provided with flat locking plates 34. Plates 34 extend axially outward from annular body 14 and reside radially inward of compression plates 20 of retainer 6. Thus, on compression of compression plate 20 toward each other to radially withdraw locking lugs 19 from through bore 11, locking plates 24 are compressed toward each other, causing coupling projections 15 to move radially outward in complementary fashion with locking lugs 19.

Notably, it is necessary to pre-assemble the retainer 6 and verification element 10 before positioning them about the head element 3 of the connector body 2. Such pre-assembly may be accomplished by urging the flat locking plates 34 together to urge coupling projections sufficiently far apart to insert them into the coupling openings 26 of retainer 6. On release of such compression, coupling projections 15 assume a position within coupling openings 26, facing radially inwardly with axial contact surfaces 23 positioned for recognition of the insertion of the male member 7 through contact with radial upset 8.

At the same time, the flat locking plates assume a position radially inward of compression plates 20 for subsequent response to movement of the compression plates toward each other on application of radially inward compressive force. The combined retainer 6 and verification element 10 may then be installed upon the head element 2 of the connector body 3 prior to joinder of the head element 3 to the sealing element 4.

As shown in FIG. 3, the coupling projections 15 of verification element 10 pass through coupling openings 26 in the retaining elements 19, so that the coupling projections 15 extend into the through bore 11 of the connector body 2. The radially inward ends of coupling projections 15, which extend into the through bore 11, have sloping contact surfaces 27. The sloping contact surfaces 27 converge from their outward ends to their inward ends diagonally in the direction of the central or longitudinal axis 25 and toward the exit port 13 of the through bore 11. The contact surfaces 27 are arranged to sense the presence of radial upset 8 of male member 7 on full insertion of the male member 7 into through bore 11. The oblique surfaces 27 of the coupling projections 15 of the coupling element protrude through the coupling openings 26 of the retaining element 19, into the through bore 11 of the connector body 2.

FIG. 4 shows the male member 7, with the retainer 6, introduced into the connector body 2 such that the male member 7 is movably guided in the axial direction with respect to the central axis 25. In this way, on axial insertion of male member 7, the retainer 6 and verification element 10 are displaced axially inward with respect to the central axis 25 to the limit of travel of retainer 6 in windows 17.

According to FIG. 4, the verification element 10 is in its initial open or unlatched position, in which the coupling projections 15 extend through the coupling openings 26 into the through bore 11. The axially outward ends of coupling projections 15 are disposed radially inward of axially inward directed ridges 30. This relationship restricts axial translation of verification element 10 toward entry port 12 until full insertion of male member 7 as is described further below.

As shown in FIG. 5, as the male member 7 is displaced further into the through bore 11 of the connector body 2, the radial upset 8 is brought into contact with the guide surfaces 24 of the retaining elements 19. Because of this, the retaining elements 19 are pressed apart in radial direction with respect to the central axis 25 so that the radial upset 8 can slide between the retaining elements 19. It is further shown in FIG. 5 that the radial upset 8 rests against the sloping contact surfaces 27 of the coupling projections 15 of the verification element 10. That is, upset 8 pushes away the coupling projections 15 in the radial outward direction from the longitudinal axis 25 of the through bore 11.

Figure 7:
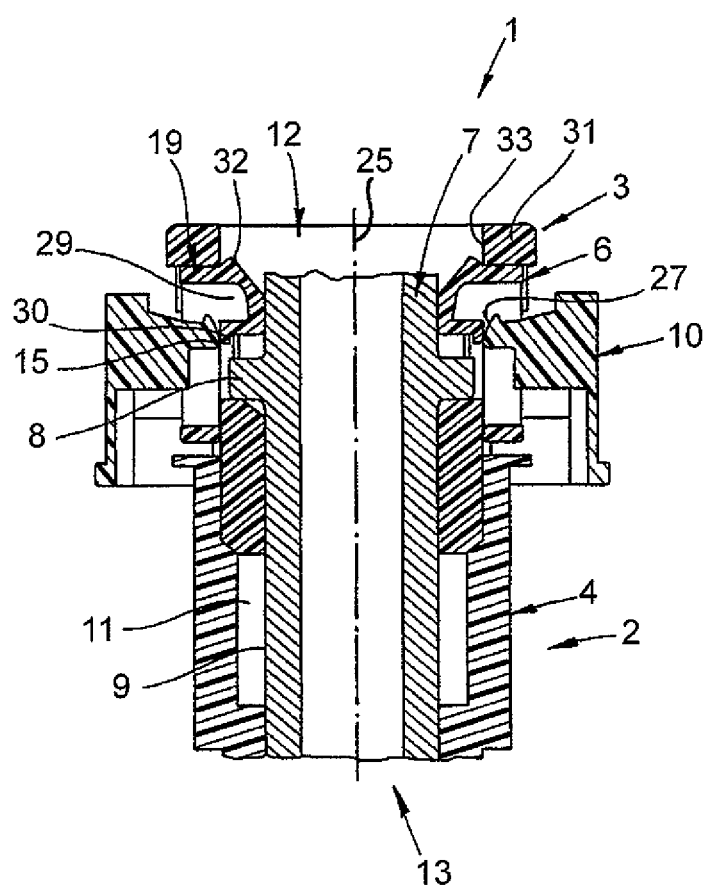
FIG. 7 shows a section through the quick connector of FIG. 4 in a fourth operating position.

As soon as the radial upset 8 passes the locking lugs 19, the locking lugs return back to an undeformed condition, so that the abutment surfaces 21 (See FIGS. 4 and 6) of the retaining elements 19 rest against the outward radial annular surface 22 of the radial upset 8 and secure the male member 7 in the connector body 2. By the radial upset 8 of the male member 7, the sloping contact surfaces 27 of the verification element 10 are pressed outward in the radial direction with respect to the longitudinal axis 25, and as shown in FIG. 6 the displacement of the sloping contact surfaces 27 radially outwardly and away from the longitudinal axis 25 causes the coupling projections 15 to be pressed away from the central axis 25 in the radial direction. In this position, the coupling projections 15 are supported upon the outer annular surface of the upset radial 8. By manually translating, or sliding the verification element 10 in the outward direction, toward the entry port 12, it is possible as shown in FIGS. 7 and 8, to move the coupling projections 15 past the axially inwardly directed ridges 30 on abutment surfaces 21 of retainer 6 and into the coupling receptacles 29 of locking lugs 19 of the retainer.

Figure 8:
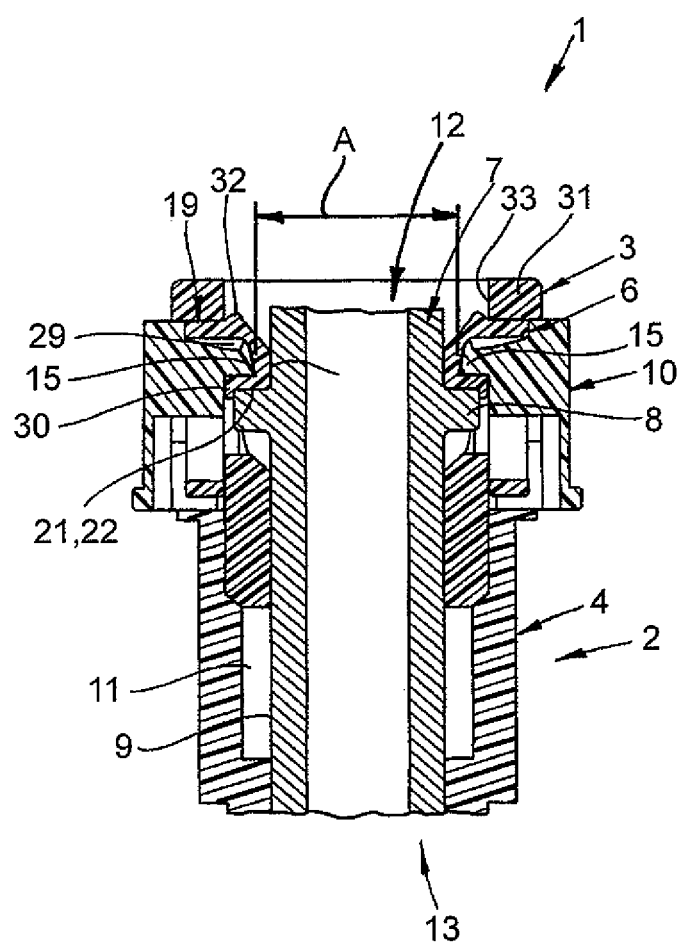
FIG. 8 is a section through the quick connector of FIG. 4 in a fifth operating position.

FIG. 8 illustrates the verification element 10 in the verification position, in which the verification element 10 is displaced in the axially outward direction toward the entry port 12 of the connector body 2 or the head element 3 the full distance of the displacement path V from its open position to its verification position. The verification position of the verification element 10 is the extreme position of the axial outward displacement, at the outward end of the axial displacement path V. The open position is the inward end of the path of axial displacement V, the extreme position of axially inward displacement.

At the outward end of displacement path V (See FIG. 5) as illustrated in FIG. 8, the coupling projections 15 enter into the coupling receptacles 29. As illustrated, in the verification position the coupling projections 15 are disposed in the coupling receptacles 29 of the locking lugs 19. There the coupling projections 15 augment the locked relationship between retainer 6 and male member 7 preventing its withdrawal from through bore 11. In fact, the coupling projections 15 are sufficient to maintain the male member 7 within the through bore on inadvertent incapacity of the retainer 6.

Notably in the verification position, illustrated in FIG. 8, the verification element 10 is axially translated outward relative to the retainer 6, closing the axial spacing between ring 5 and annular body 14 thus providing visual confirmation of a complete securement of the male member within through bore 11.

FIGS. 4 to 8 show that the verification element 10 can be displaced only from the open position shown in FIG. 4 to the verification position shown in FIG. 8, when the male member 7 is fully inserted into the connector body 2. There the radial upset 8 is secured by the retaining elements 19 of the retainer 6 in the connector body 2. The displacement of the verification element 10 from the open position shown in FIG. 4 to the verification position as shown in FIGS. 4 and 8 allows easy detection of the properly established connection between the male member 7 and the connector body 2. It is further illustrated in FIG. 8 that a radial distance A between the coupling projections 15 is designed such that the distance A is smaller than the diameter of the radial upset 8 of the male member 7. This guarantees in case of failure of the retainer 6, it is ensured that the retaining elements 19 and/or coupling projections 15 abut outward radial annular surface 22 of the radial upset 8 and redundantly secure the male member 7 in the connector body 2.

Moreover, FIGS. 4 and 8 show that the verification element 10 is locked with the retainer 6 both in the open position shown in FIG. 4 and in the verification position shown in FIG. 8.

FIG. 8 furthermore shows that a force exerted on a fluid system, which is not shown, the male member 7 is pushed in the direction of the entry port 12. Thereby the radial upset 8 of the male member 7 acts on the retaining elements 19 of the retainer, whereby the retainer is pressed against a collar 31 of the head element 3, in which the entry port 12 is arranged. As shown in FIG. 8, the retaining elements 19 each have a security projection 32, wherein the security projections 32 rest against a through bore-side annular surface 33 of the head element 3 or the collar 31. In this way, it is ensured that an unintended deformation of ring 5 of the retainer 6 and the annular body 14 of the verification element 10 is prevented, which could otherwise result in an inadvertent release of the male member 7.

Another embodiment of a quick connector, designated 100, according to the invention, is depicted in the FIGS. 10 to 14. Identical reference symbols are used in FIGS. 1 to 9 as well as 10 to 14 for identical components or parts of the quick connector 1 and the quick connector 100. Modifications of components used in FIGS. 1 to 9 have the same reference number along with a "prime," and these components have similar structure and function as the components described in reference to FIGS. 1 to 9, except where noted below. The quick connector 100 of FIGS. 10 to 14 is essentially the same as the quick connector 1 of FIGS. 1 to 9 with the following exceptions.

Referring to FIG. 3, the retainer 6 of this embodiment includes diametrically positioned coupling openings 26 through which the coupling projections 15 of the verification element 10 extend. As previously described, when the verification element 10 is in the initial open position, the coupling projections 15 prevent axial translation of the verification element through an butting relation with abutment surfaces 21 of the locking lugs 19 of retainer 6. They are also accessible through coupling openings 26 for radial outward displacement by the radial upset 8 of male member 7 to permit axial translation of the verification element to the verification position, for example, as illustrated in FIG. 7.

Referring to FIGS. 10 through 14, it is depicted that retainer 6' includes lifting arms 35, within coupling openings 26' which are connected to the retainer 6' at diametrically opposing sides to one another, and which flank the through bore 11. The lifting arms 35 depicted in FIGS. 10 to 14 are each associated with a coupling projection 15' of verification element 10', wherein the coupling projections 15' lie against the lifting arms 35 of the retainer 6' in the open position of the verification element 10' depicted in FIG. 10. In this regard, the coupling projections 15' of the embodiment of FIGS. 10 to 14 are of a somewhat lesser radial length than the coupling projections 15 of the embodiment of FIGS. 1 to 9 to account for the radial thickness of the lifting arms 35.

Figure 10:
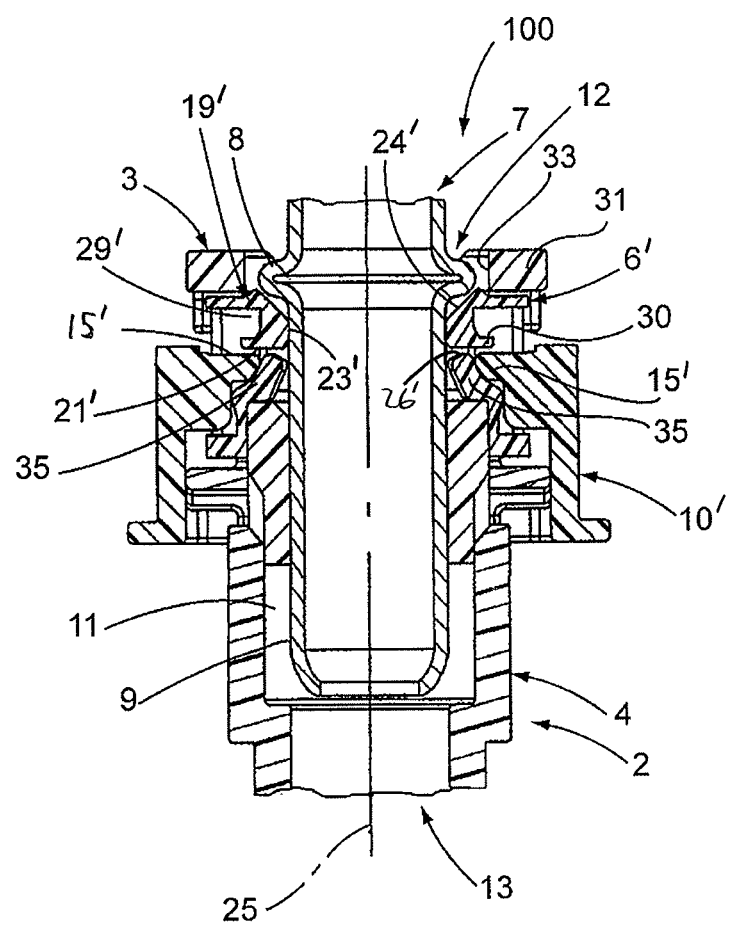
FIG. 10 is a section through another modified form of quick connector according to the invention, in a first operating position.

The pre-assembled state of quick connector 100 is depicted in FIG. 10, wherein the head element 3 of the connector body 2 is inserted into the back of retainer 6' and the verification element 10', and locked to the sealing element 4, wherein the retainer 6' lies against the collar 31 of the head element 3. As illustrated in FIG. 10, the male member 7 is inserted in the through bore 11, such that the radial upset 8 of the male member 7 does not yet act on angled surfaces 24' of locking lugs 19' of retainer 6'. If the male member 7 is further pushed in the direction of insertion, or from the entry port 12 toward the exit port 13 along the longitudinal axis 25 of the through bore 11 in the connector body 2, respectively, then the upset 8 is brought into contact with the angled surfaces 24' of the retainer 6'. As a result, the locking lugs 19' of retainer 6' are expanded, as is depicted in FIG. 11 as a result of contact of radial upset 8 with the angled guide surfaces 24' of the locking lugs 19' of retainer 6'.

Figure 11:
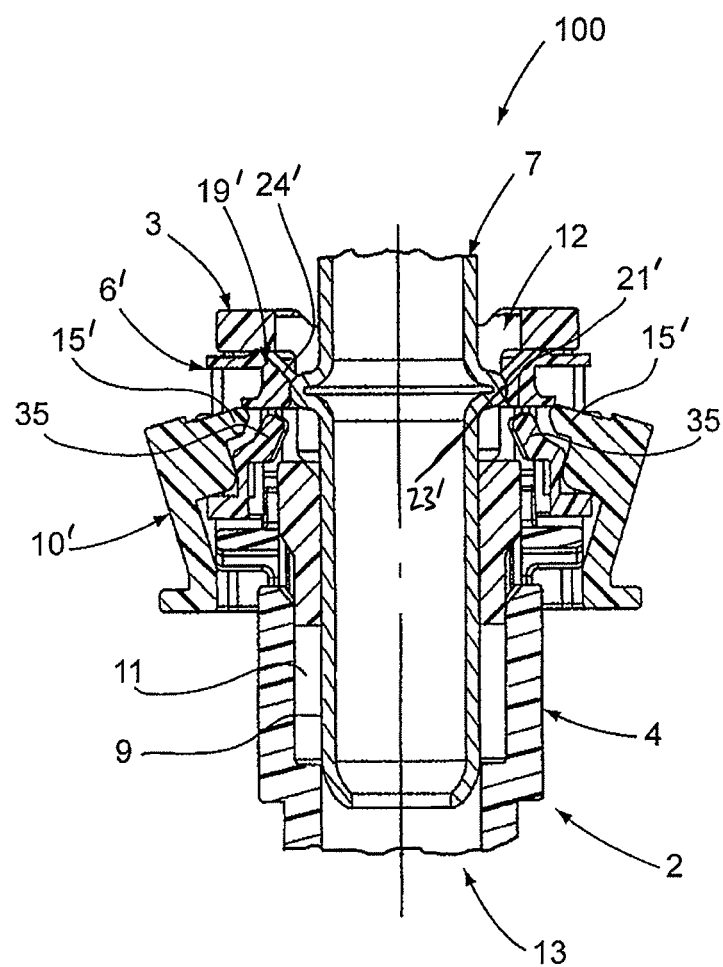
FIG. 11 is a section through the quick connector according to FIG. 10, in a second operating position.

In FIG. 11, axial contact surfaces 23' of the locking lugs 19' of the retainer 6' are radially outward of the upset 8, and rest against the upset 8. As a result of the radial expansion of the locking lugs 19' of retainer 6', the verification element 10' is likewise expanded, wherein a displacement of the verification element 10' from an initial open position depicted in FIGS. 10 and 11 to the verification position depicted in FIG. 14 is impossible, because the coupling projections 15' of the verification element 10' cannot be moved past the abutment surfaces 21' of the locking lugs 19' in a direction toward the entry port 12.

Figure 12:
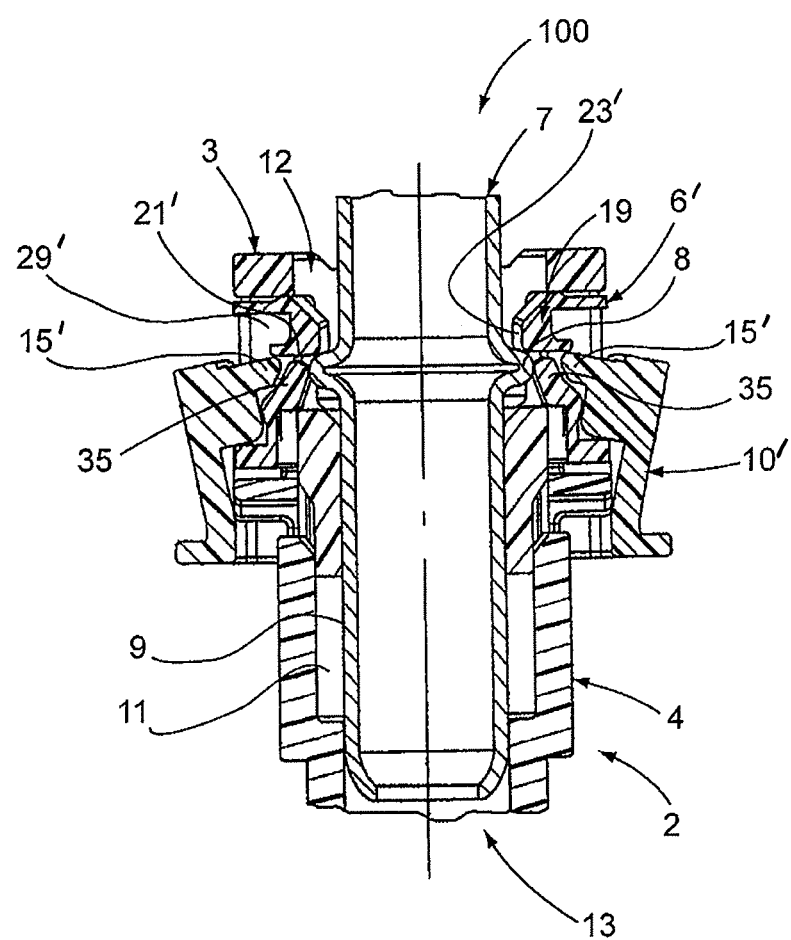
FIG. 12 is a section through the quick connector according to FIG. 10, in a third operating position.
Figure 13:
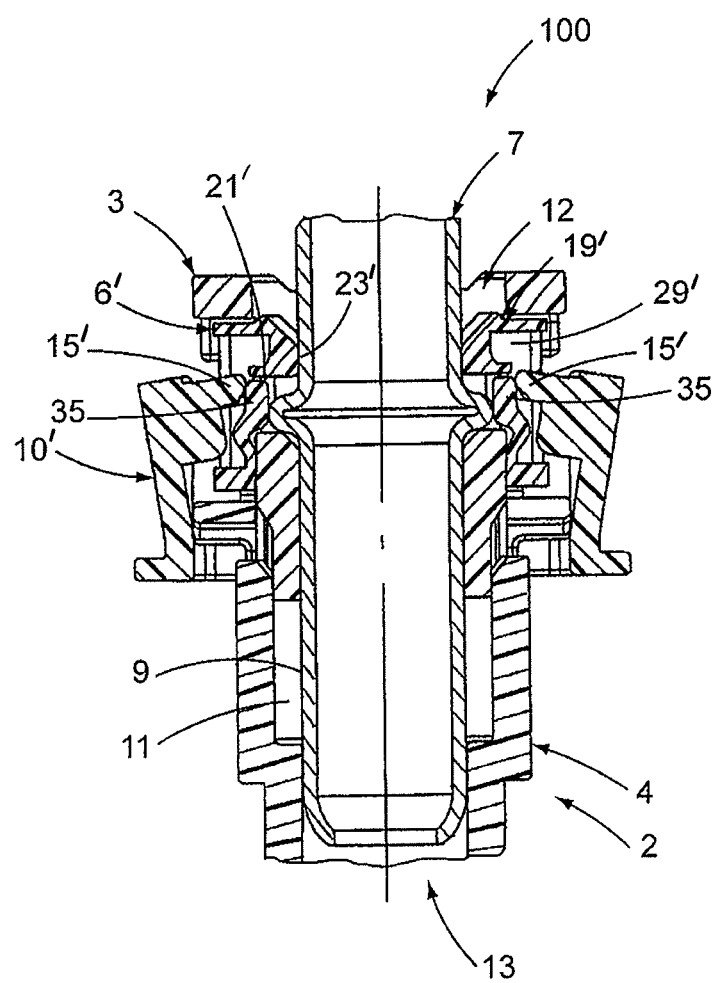
FIG. 13 is a section through the quick connector according to FIG. 10, in a fourth operating position.

The further insertion of the male member 7 toward the exit port 13 is depicted in FIGS. 12 and 13. In FIG. 12, both the locking lugs 19' of the retainer 6', as well as the lifting arms 35, rest against the upset. Because the axial contact surfaces 23' of the locking lugs 19' of retainer 6' do not yet rest against the sealing surface 9 of the male member 7, displacement of the verification element 10' toward the entry port 12 is prevented by means of the coupling projections 15' resting against the abutment surfaces 21'. If the male member 7, starting from the position shown in FIG. 10, is displaced further in the insertion direction, in accordance with FIG. 13, the contact surfaces 23' of the locking lugs 19' are brought into contact with sealing surface 9 of the male member 7, and the lifting arms 35 within coupling openings 26' of retainer 6' are pushed apart from one another by means of the upset 8. The transition position, or displacement position, respectively, of the verification elements 10' is depicted in FIG. 13, in which displacement position, the lifting arms 35 push the coupling projections 15' of the verification element 10' apart, in such a manner that the coupling projections 15' can slide past the abutment surfaces 21' of the retainer 6'. The verification element 10' can be displaced toward the entry port 12, starting from the position depicted in FIG. 13, to the verification position depicted in FIG. 14. In the verification positions of FIG. 14, the coupling projections 15' of the element 10' reside within the coupling receptacles 29' of the locking lugs 19' of retainer 6'. The unstressed shape of the verification element 10' urges the coupling projections 15' into the coupling receptacles 29' and releasably retains them in the receptacles 29'. It is necessary to apply an external force to deform the shape of the verification element 10' to dislodge the coupling projections 15' from the coupling receptacles 29' of the retainer 6'.

Figure 14:
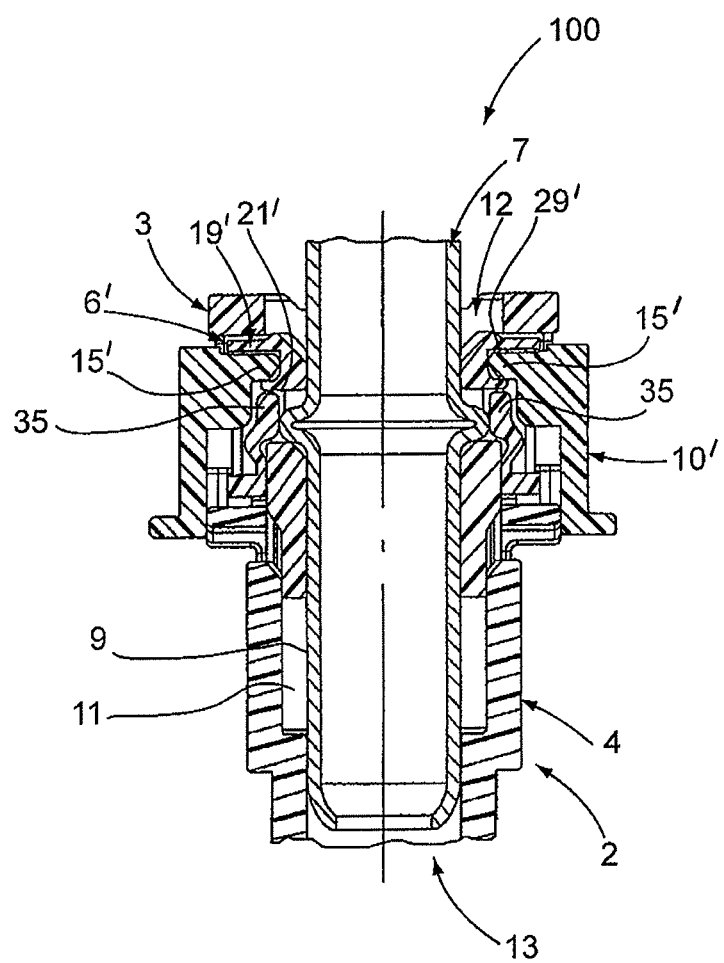
FIG. 14 is a section through the quick connector according to FIG. 10, in a fifth operating position.

In the verification position of the verification element 10' depicted in FIG. 14 removal of the male member 7 from the connector body 2 is precluded by both the retainer 6' and the verification element 10'. The release of the connection between the connector body 2 and the male member 7 in accordance with the quick connector 100 occurs in a manner analogous to the separation of the connection between the male member 7 and the connector body 2 in accordance with the quick connector 1 of the earlier embodiment.

Preferably, and according to the embodiment example in accordance with FIGS. 10 to 14, the lifting arms 35, supported in a spring-loaded manner on the retainer 6', exhibit a lower return force than the locking lugs 19 connected in a spring-loaded manner to the back of retainer 6 in the embodiment of FIGS. 1 to 9. In this manner, it is ensured, preferably and as shown in FIGS. 10 to 14, that with a pressing of the lifting arm 35 against the retainer 6', through the upset 8 of the male member 7, only the lifting arms are deformed, or pushed outward, respectively, and the locking lugs 19' of the retainer 6' rest against the male member 7, or preferably, and according to FIG. 13, against the cylindrical sealing surface 9 of the male member 7.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for, practicing the invention and will enable others skilled in the art to utilize the invention. The claims are to be construed to include alternative embodiments to the extent permitted by the prior art.

The invention claimed is:

1. A quick connector for making a releasable connection in a fluid line having a connector body, a male member, and a retainer, wherein the connector body comprises a through bore, wherein the male member has a radial upset so that the male member introduced into the through bore is releasably fixable in the through bore by the retainer, wherein the retainer comprises a ring, wherein the ring extends externally circumferentially around the male member and the connector body, wherein the quick connector comprises a verification element, wherein the verification element comprises an annular body, wherein the annular body extends circumferentially around the male member and the connector body, and wherein the verification element can be displaced in the axial direction with respect to the through bore and to the retainer from an initial position to a verification position, when the male member is secured by the retainer in the through bore, wherein said verification element includes a coupling element comprising at least one coupling projection, wherein the retainer is formed with at least one coupling opening and wherein the at least one coupling projection in the initial position of the verification element is arranged in the at least one coupling opening of said retainer, and wherein said at least one coupling projection in said initial position of the verification element protrudes in the radial direction into the through bore and upon insertion of the male member into the connector body can be pressed away by a radial upset of the male member in such a way from the longitudinal axis of the through bore that the at least one coupling projection can be pushed radially outward relative to the at least one coupling opening, that the verification element can slide in the axial direction from the initial position to the verification position.

2. The quick connector according to claim 1, wherein in the verification position, the verification element is connected to the retainer or is integrated with the retainer.

3. The quick connector according to claim 1, wherein the verification element in the initial position and/or in the verification position is releasably locked with the retainer.

4. The quick connector according to claim 1, wherein the verification element and/or the retainer are held captive on the connector body.

5. The quick connector according to claim 1, wherein the retainer includes a coupling receptacle, which is openly formed on the surface of the retainer that is facing away from the through bore, and wherein in the verification position, the coupling element of the verification element is retained in the coupling receptacle.

6. The quick connector according to claim 1, wherein the verification element comprises two coupling projections, wherein the coupling projections have a distance from each other in the direction of a diameter of the through bore, which is smaller than the diameter of the radial upset of the male member, so that in the verification position of the verification element the male member is secured by the retainer and the verification element to the connector body.

7. The quick connector according to claim 1, wherein the retainer comprises at least one locking lug, which in the assembled condition co-operates with the radial upset of the male member, and in which retaining element the male member can be secured in the connector body.

8. The quick connector according to claim 7, wherein the retaining element extends through a window arranged in the connector body in a head element of the connector body and secures the male member in the connector body.

9. The quick connector according to claim 7, wherein the retainer comprises at least one compression plate, wherein by a force, which is directed to the center axis of the through bore and exerted on the compression plate, the retainer is deformable such that the retaining element can be displaced in the radial direction away from the central axis of the through bore, and the radial upset of the male member is released from the retaining element.

10. The quick connector according to claim 9, wherein the verification element comprises at least a flat locking element, which in the verification position is disposed between the compression plate and the radially outward surface of the connector body, and couples the verification element with the retainer such that in the assembled state the retainer of the quick connector is exclusively deformable together with the verification element.

11. The quick connector according to one of claim 1, wherein the retainer and/or the verification element are made of a flexible material.

12. The quick connector according to claim 1, wherein a lifting arm is formed within the at least one coupling opening of the retainer, and wherein the at least one coupling projection of said verification element rests against the lifting arm, and wherein a radial upset of the male member presses exclusively via the lifting arm against the at least one coupling projection.

13. The quick connector according to claim 12, wherein the verification element includes two coupling projections, and wherein the coupling projections exhibit a spacing to one another, set in the direction of a diameter of the through bore smaller than the diameter of the upset of the male member, such that in the verification position the male member is secured by both the retainer and the verification element.

14. A quick connector for making a releasable connection in a fluid line having a connector body, a male member, and a retainer, wherein the connector body comprises a through bore, wherein the male member has a radial upset so that the male member introduced into the through bore is releasably fixable in the through bore by the retainer, wherein the retainer comprises a ring, wherein the ring extends externally circumferentially around the male member and the connector body, wherein the quick connector comprises a verification element, wherein the verification element comprises an annular body, wherein the annular body extends circumferentially around the male member and the connector body, and wherein the verification element can be displaced in the axial direction with respect to the through bore and to the retainer from an initial position to a verification position, when the male member is secured by the retainer in the through bore, wherein said verification element includes a coupling element comprising at least one coupling projection, wherein the retainer is formed with at least one coupling opening and wherein the at least one coupling projection in the initial position of the verification element is arranged in the at least one coupling opening of said retainer, wherein a lifting arm is formed within the at least one coupling opening of the retainer, and wherein the at least one coupling projection of said verification element rests against the lifting arm, and wherein a radial upset of the male member presses exclusively via the lifting arm against the at least one coupling projection, and wherein the at least one coupling projection extends radially into the through bore when the verification element is in the initial position, and rests against said lifting arm, and wherein the at least one coupling projection can be pushed away, during the insertion of the male member into the connector body by means of an upset of the male member, from the longitudinal axis of the through bore in the radial direction, and that the at least one coupling projection can be pushed radially outward relative to the at least one coupling opening such that the verification element can be slid axially from the initial position to the verification position.

15. The quick connector according to claim 14, wherein the said retainer includes at least one locking lug having a coupling receptacle formed such that said at least one coupling projection is accommodated therein when said verification element is in said verification position.

16. The quick connector of claim 14 wherein said verification element includes two diametrically opposed coupling projections and said retainer includes two diametrically opposed coupling openings each having a lifting arm disposed therein.

17. The quick connector according to claim 16, wherein the retainer includes two locking lugs acting on the upset of the male member when in the assembled state to releasably secure the male member within the connector body, each said locking lug having a coupling receptacle and each said coupling projection of said verification element disposed in one of said coupling receptacles when said verification element is in said verification position.

* * * * *